United States Patent
Ono

[11] Patent Number: 5,559,944
[45] Date of Patent: Sep. 24, 1996

[54] USER SPECIFICATION OF PULL DOWN MENU ALIGNMENT

[75] Inventor: Makoto Ono, Yokohama, Japan

[73] Assignee: International Business Machines Corporation, Armonk, N.Y.

[21] Appl. No.: 6,271

[22] Filed: Jan. 11, 1993

[30] Foreign Application Priority Data

Feb. 7, 1992 [JP] Japan ............ 4-022602

[51] Int. Cl.⁶ .................................. G06F 3/14
[52] U.S. Cl. .............. 395/156; 395/155; 395/157
[58] Field of Search .................... 395/156, 157, 395/146, 155, 159, 700; 364/411, 477, 506; 356/326

[56] References Cited

U.S. PATENT DOCUMENTS

| | | | |
|---|---|---|---|
| 4,893,258 | 1/1990 | Sakuragi | 364/521 |
| 4,896,291 | 1/1990 | Gest et al. | 364/900 |
| 5,079,695 | 1/1992 | Dysart et al. | 395/700 |
| 5,142,618 | 8/1992 | Fujiwara | 395/146 |
| 5,179,368 | 1/1993 | Lippincott | 340/707 |
| 5,317,687 | 5/1994 | Torres | 395/159 |
| 5,335,320 | 8/1994 | Iwata et al. | 395/155 |
| 5,367,624 | 11/1994 | Cooper | 395/157 |

FOREIGN PATENT DOCUMENTS 3-268157  11/1991  Japan.

OTHER PUBLICATIONS

IBM Technical Disclosure Bulletin, vol. 32 No. 8A, Jan. 1990, Menu Display Method for Integrated Input/Display Device, pp. 370–372.

IBM AIX Next Step Enviroment/6000, SC23-2357, Next-Step Enviroment User Interface Overview, pp. 2–29.

*Primary Examiner*—Mark R. Powell
*Assistant Examiner*—Ruay Lian Ho
*Attorney, Agent, or Firm*—Jeffrey S. Labaw

[57] ABSTRACT

A vertically extending menu bar is displayed at the right or left end of a screen, and a pull-down menu is further displayed which downwardly extends in an arc from a selected item of the menu bar to the center. The invention facilitates the use of a computer I/O device in which a liquid crystal display device and a touch sensor are integrated. The character string display of each menu bar item is inclined and space is omitted. The locus along which the pull-down menu extends can be calibrated to the user.

27 Claims, 14 Drawing Sheets

PRIOR ART
FIG. 1

PRIOR ART

FIG. 2

PRIOR ART

$a1 = y1 - y0 \qquad a2 = y2 - y1$ $b1 = x1 - x0 \qquad b2 = x2 - x1$ $$c1 = \frac{b1(x1 + x0) - a1(y1 + y0)}{2}$$

$$c2 = \frac{b2(x2 + x1) - a2(y2 + y1)}{2}$$

$$Cx = \frac{a1c2 - a2c1}{a2b1 - a1b2}$$

$$Cy = \frac{b1c2 - b2c1}{a1b2 - a2b1}$$

$Cr = \operatorname{sqrt}((Cx-x1)(Cx-x1) + (Cy-y1)(Cy-y1))$

Calibration data $(C_x - x_0), (C_y - y_0)$ where $(x_0, y_0)$ = calibration start point $P_x = X_0 + (C_x - x_0)$
$P_y = Y_0 + (C_y - y_0)$ $X_{i+1} = X_i - (P_x - X_i)/(P_y - Y_i) * H_i$
$Y_{i+1} = Y_i + H_i$

USER SPECIFICATION OF PULL DOWN MENU ALIGNMENT

BACKGROUND OF THE INVENTION

1. Field of the Invention

The present invention is related to a user interface of a computer system. More particularly, it is related to an efficient menu process in the display screen of an integrated I/O (input/output) device or the like which uses a transparent tablet and a liquid crystal display.

2. Prior Art

Figure 1:
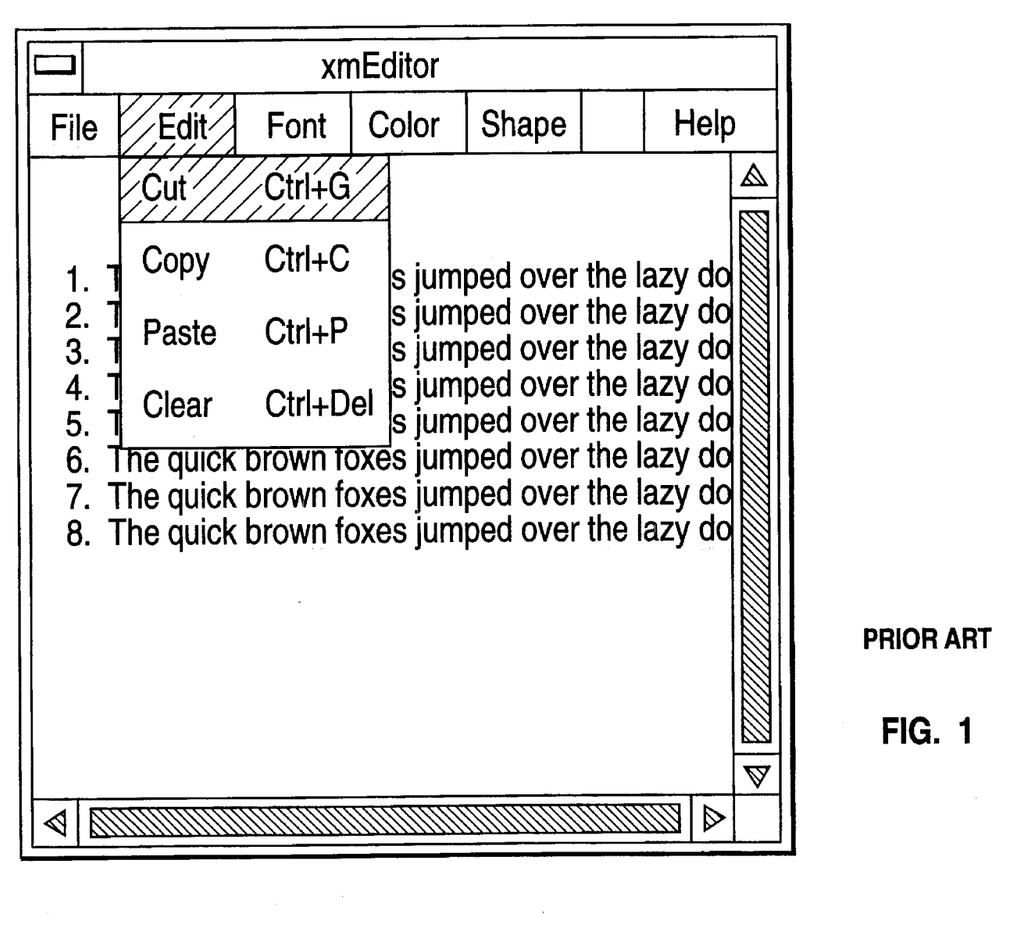
FIG. 1 is an illustration for explaining the conventional pull-down menu system.

The conventional computer user interaction technique has been developed mainly on the basis of a bit map display and mouse (or tablet), and it is designed for user operation on the assumption that the whole screen is basically visible. A typical example of user interaction is to use a menu. This is a method in which choices such as commands are displayed on a bit map display and input by the use of a pointing device such as a mouse. There is a pull-down menu as shown in FIG. 1 in which the menu is hierarchical to improve usability. In this menu system, a menu bar is usually positioned in the upper portions of a display or window and the individual items are laterally arranged, and a pull-down menu is vertically displayed. Since a user generally scans the screen from top to bottom in a system using a mouse and a bit map display, such an arrangement between the menu bar and the pull-down menu is very efficient.

Owing to the advance of sensor and liquid crystal technologies, an integrated I/O device using a transparent tablet and a liquid crystal display has been developed, replacing the bit map display and mouse. This device is characterized in that an item now on display can be directly operated; the position of the item being displayed is coincident with that of the object to be operated. However, the direct use of the conventional pull-down menu system has the following problems.

Figure 2:
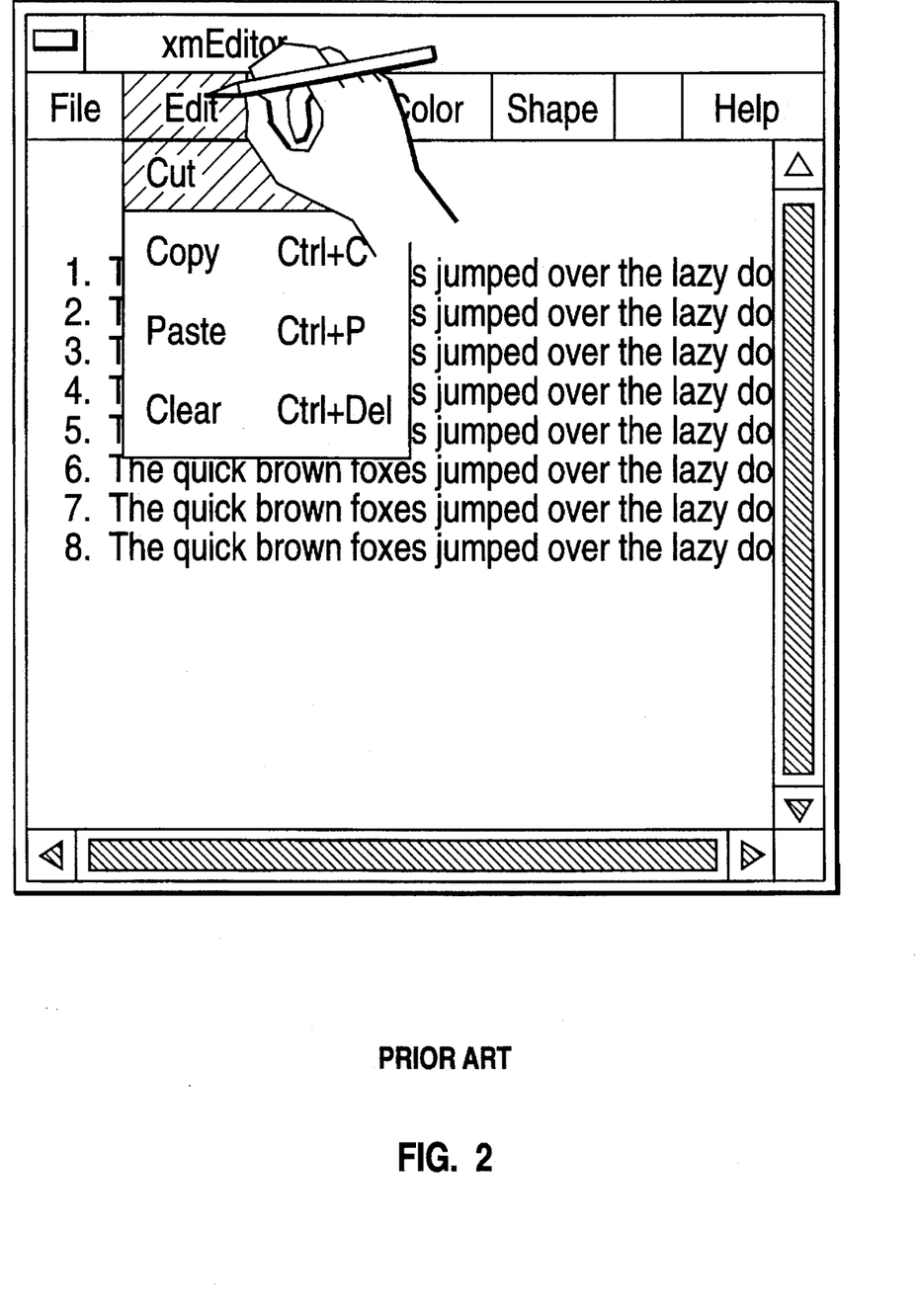
FIG. 2 is an illustration for explaining the conventional pull-down menu system.

(1) The menu items on the menu bar at the side of the arm having a pen are hidden. (See FIG. 2.)

(2) The pull-down items are also hidden by the hand while they are being selected in the downward direction, even though the first item is in sight. (See FIG. 3.)

Incidentally, the patent references related to the present invention include the Published Unexamined Patent Application Nos. 254233/1987 and 205722/1988 official gazettes. Although these are to improve the conventional menu bar and pull-down menu scheme, the menu bar is laterally arranged at the top of the screen, and thus they are different from the present invention. In addition, a method for diagonally displaying a pull-down menu is disclosed in *IBM Technical Disclosure Bulletin*, Vol. 32, No.8, pp. 370–372, January 1990, but the menu bar is also laterally arranged at the top of the screen in this method.

Also in a user-friendly user interface, icons representing applications may be vertically lined up, for instance, at the right end of the screen (IBM AIX NextStep Environment/6000, sc23-2357, p. 2–29), but this is to display the frequently used applications in order for easy understanding, and thus pen input is not taken into consideration. Further, an application is merely initiated by selection of an icon in such interface, and a pull-down menu or the like is not further displayed.

SUMMARY OF THE INVENTION

It is the object of the present invention to provide a user interface technique for pen input.

In the present invention, a menu bar is vertically lined up at the right or left end of a screen (or window), preferably, at the user's dominant arm side, whereas the conventional menu bar is laterally lined up at the top of a screen (or window). More preferably, the pull-down portion is provided with an arc in consideration of the movement of the wrist. Hereinafter, the description given is for right-handed users, while left and right are to be reversed for left-handed users. The pull-down angle is calibrated before use since it depends on factors such as left- or right-handedness, the size of the hand, the length of the upper arm, and the work space position (particularly, the angle from the center of the chair back). In addition, to prevent space from being wasted in continuity of the operation from the menu bar and left-to-right writing of characters, the content of the menu bar items may be displayed at an angle. The contents of the menu bar may be represented by icons.

Figure 3:
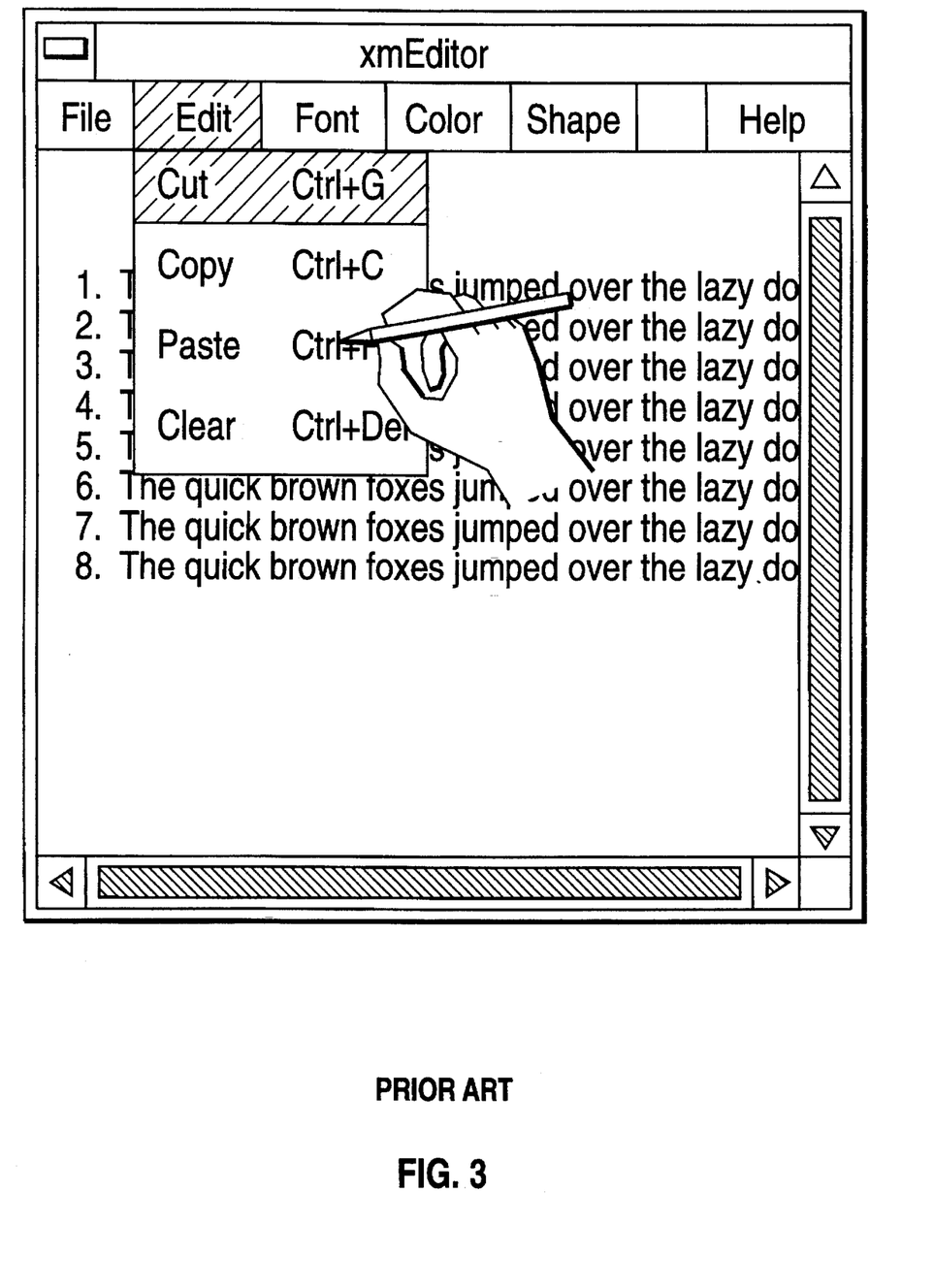
FIG. 3 is an illustration for explaining the conventional pull-down menu system.
Figure 4:
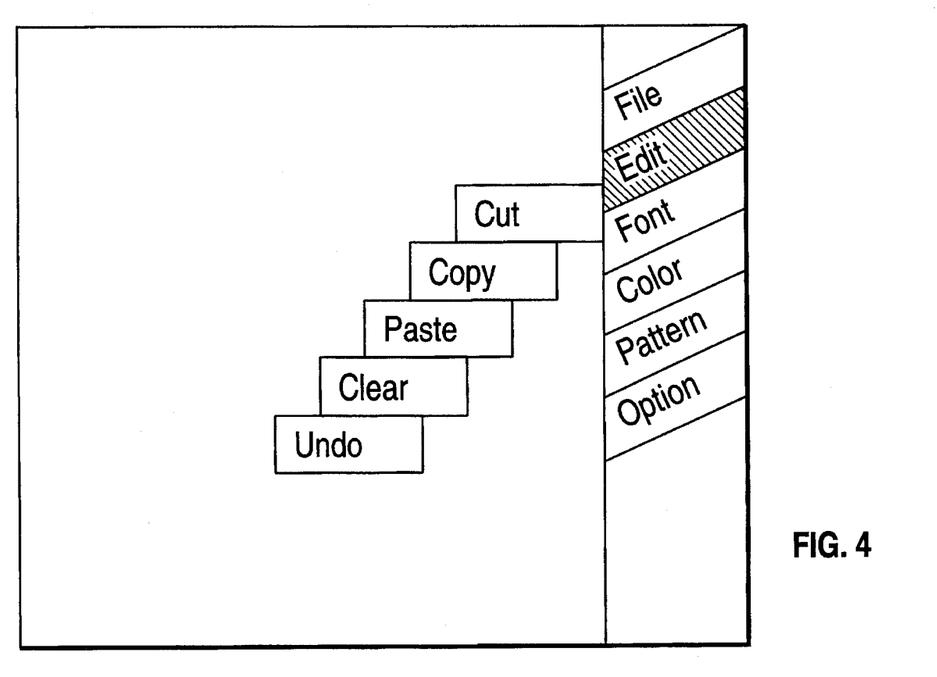
FIG. 4 is an illustration for explaining the outline of the present invention.
Figure 5:
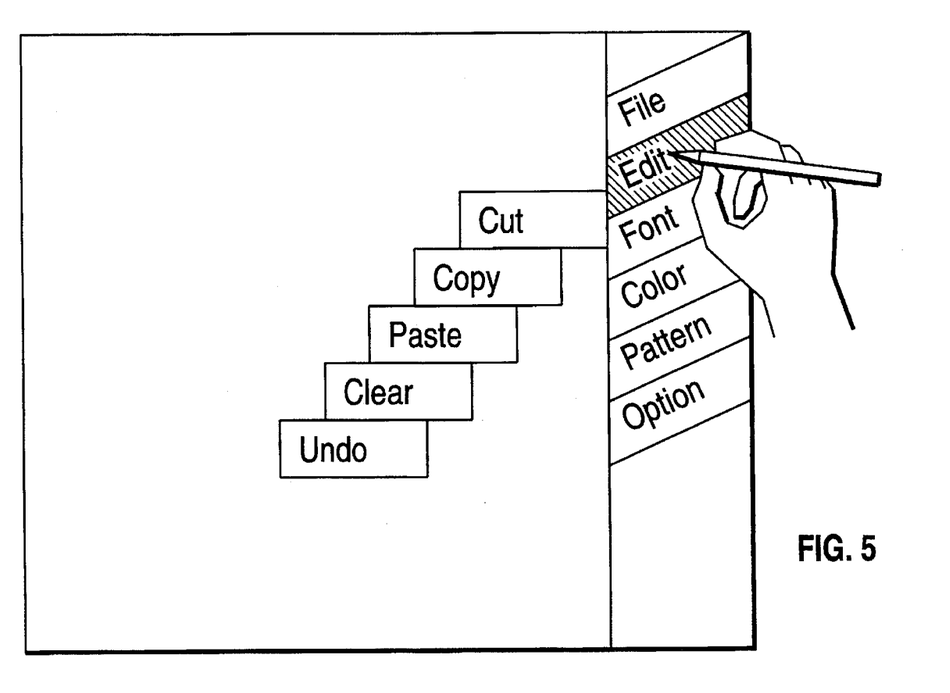
FIG. 5 is an illustration for explaining the outline of the present invention.
Figure 6:
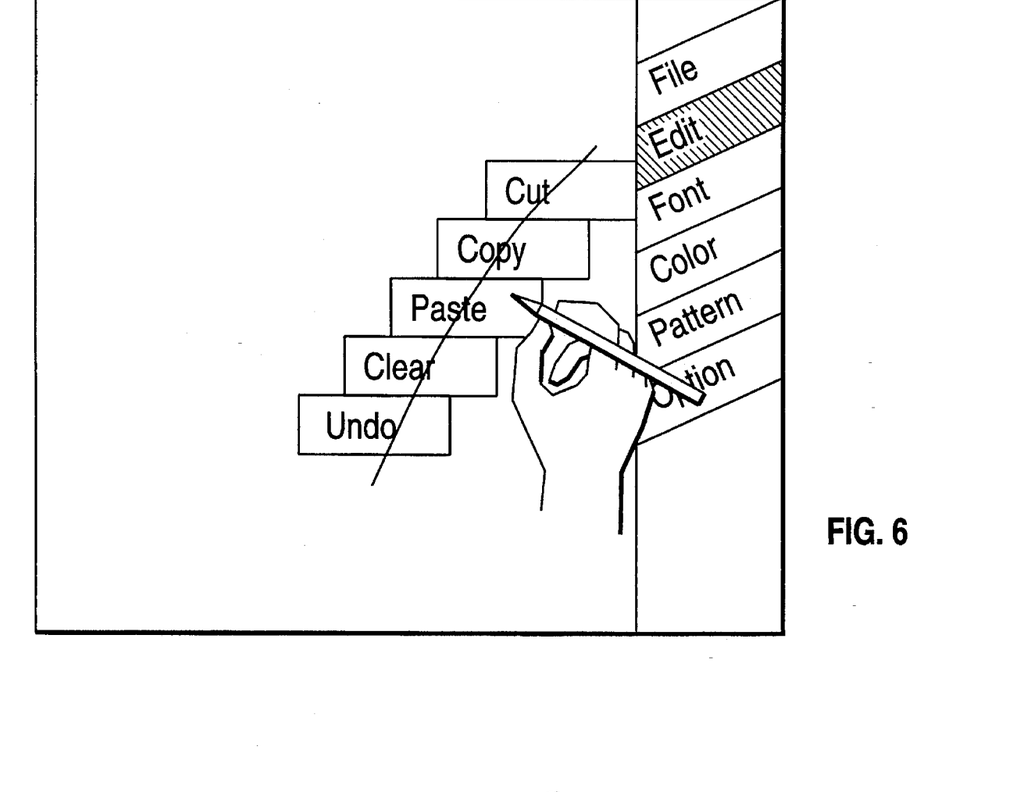
FIG. 6 is an illustration for explaining the outline of the present invention.

When a user points at the screen with a pen, the arm is placed from the lower right to the upper left of the screen. In the conventional menu bar laterally arranged at the top of the screen or window, when a certain item is selected, the adjacent item is hidden by the hand as shown in FIG. 3. In the present invention, however, all the items are displayed without being hidden.

In the conventional vertically arranged pull-down menu, the arm is moved to a great extent or the wrist is forced to unnaturally move when a lower item is selected, and thus it cannot be said that the operating properties are good. On the other hand, in the present invention, all the menu items can be selected by a motion which does not impose an unnatural force.

DETAILED DESCRIPTION OF THE DRAWINGS

Now, an embodiment of the present invention is described with reference to the drawings.

This embodiment can be constructed by newly adding a calibration function to the conventional menu system and also slightly modifying the menu bar subsystem and pull-down subsystem.

Calibration Function

Figure 7:
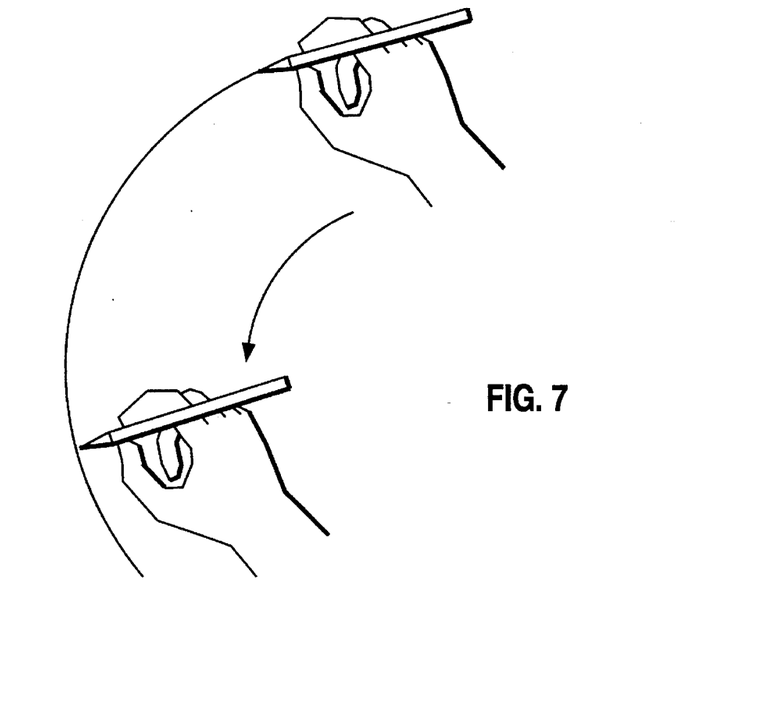
FIG. 7 is an illustration for explaining the outline of the embodiment of the present invention.

Since the locus for tracing the pull-down menu with a pen without causing an unnatural force depends on an individual calibration for each individual is essential. First, each individual is caused to indicate one point on the screen as shown in FIG. 7. Then, the wrist is caused to indicate an end point to which it can move without causing unnatural force, and the locus traced by the pen point is fitted to an arc, thereby obtaining an arc along which the menu is to be displayed.

Menu Bar Subsystem

This can easily be created by exchanging the X- and Y-coordinate of the offset calculation in the current menu bar subsystem. However, since it is considered that each item length of the menu bar, usually, one to two words, is short enough in comparison to the radius of gyration of the wrist, the inclination angle is to be constant.

Pull-down Menu Subsystem

Figure 8:
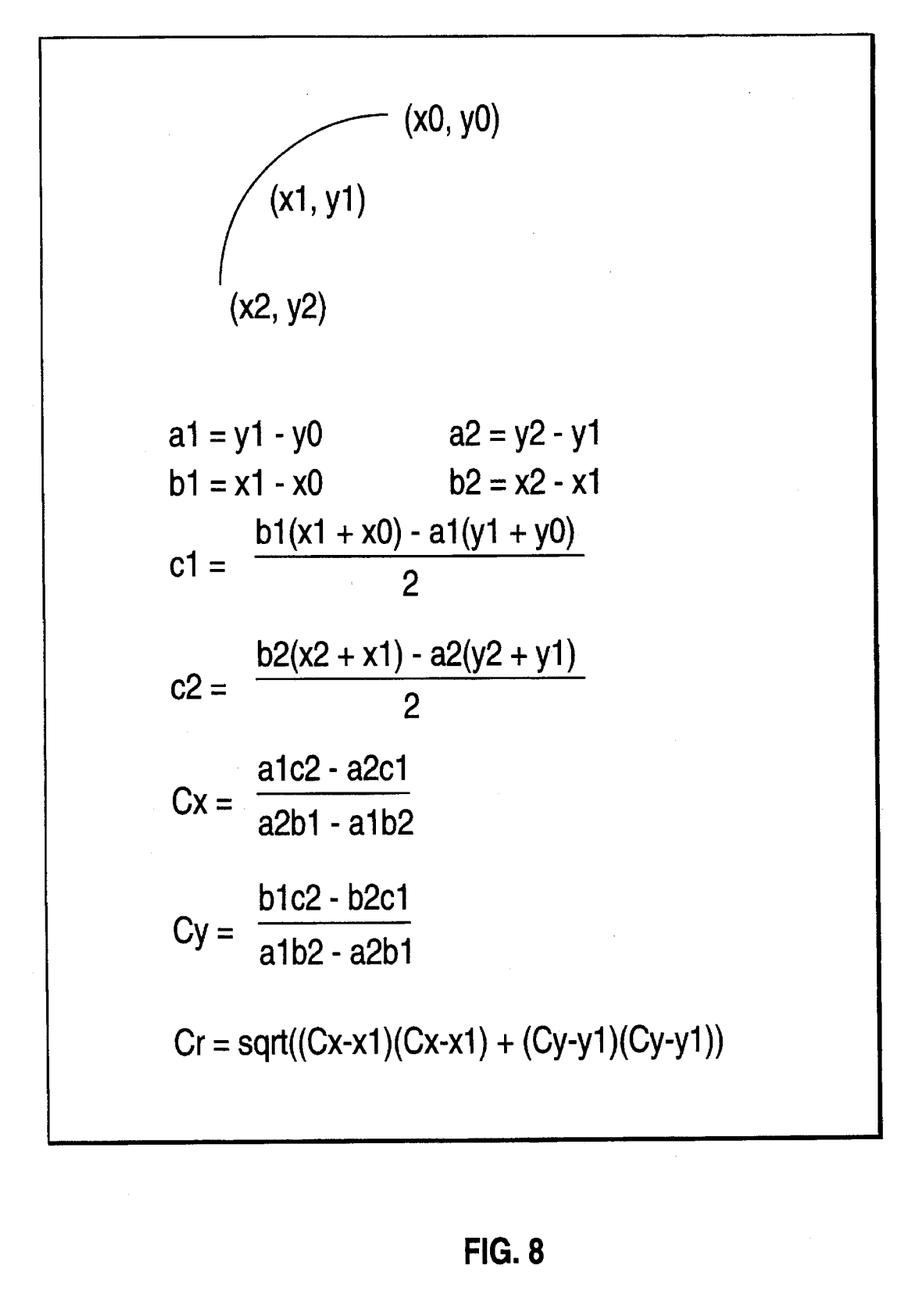
FIG. 8 is an illustration for explaining the outline of the embodiment of the present invention.
Figure 9:
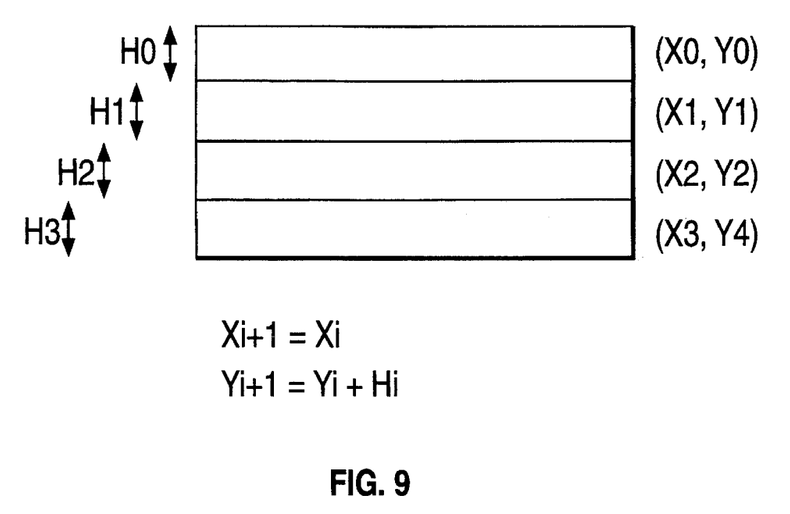
FIG. 9 is an illustration for explaining the outline of the embodiment of the present invention.
Figure 10:
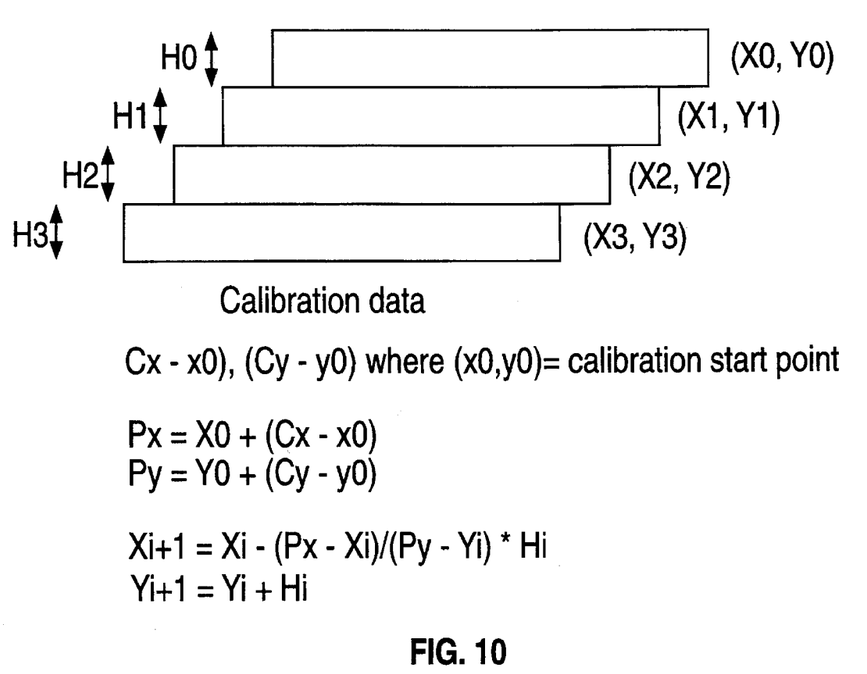
FIG. 10 is an illustration for explaining the outline of the embodiment of the present invention.

In the conventional vertically arranged menu system, a vertical offset is merely added to the end when the next item is created after the first item has been created (see FIG. 9). On the other hand, in the menu system of the present invention, the position of the subsequent item is determined by the method shown in FIG. 10 on the basis of the calibration data shown in FIG. 8. This method can easily be added to the existing menu system.

The details of the above-mentioned calibration function and the modifications to the menu bar subsystem and pull-down subsystem are described below.

Figure 11:
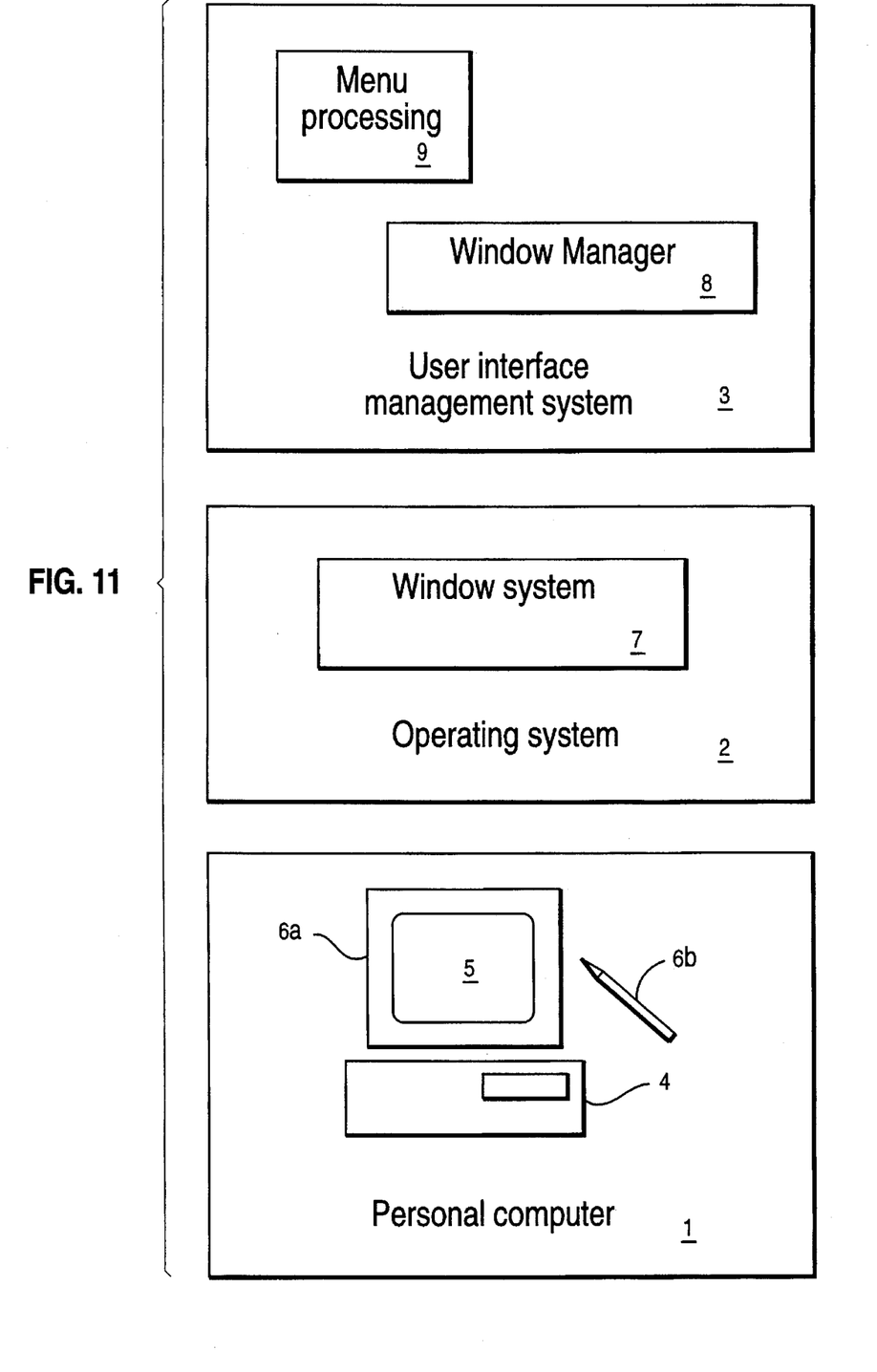
FIG. 11 is a diagram showing the entire configuration of the embodiment of the present invention.

FIG. 11 generally shows the system configuration of this embodiment, in which the system comprises personal computer 1, operating system 2 and user interface management system 3. Personal computer 1 is, for instance, a PS/55 of IBM Japan, Ltd. (PS/55 is a trademark of International Business Machines Corporation, U.S.A.), and consists of processor 4, liquid crystal display device 5, transparent tablet 6a and pen 6b. Operating system 2 is, for instance, AIX PS/2 of IBM Japan, Ltd. (AIX and PS/2 are trademarks of International Business Machines Corporation, U.S.A.). This operating system 2 includes window system 7 which manages the output to liquid crystal display device 5 and the input from transparent tablet 6a. User interface management system 3 performs complex processing of the inputs and outputs such as the menu processing, and in this system, data reception and transfer to the display/selection/ application programs of the menu are executed.

Figure 12:
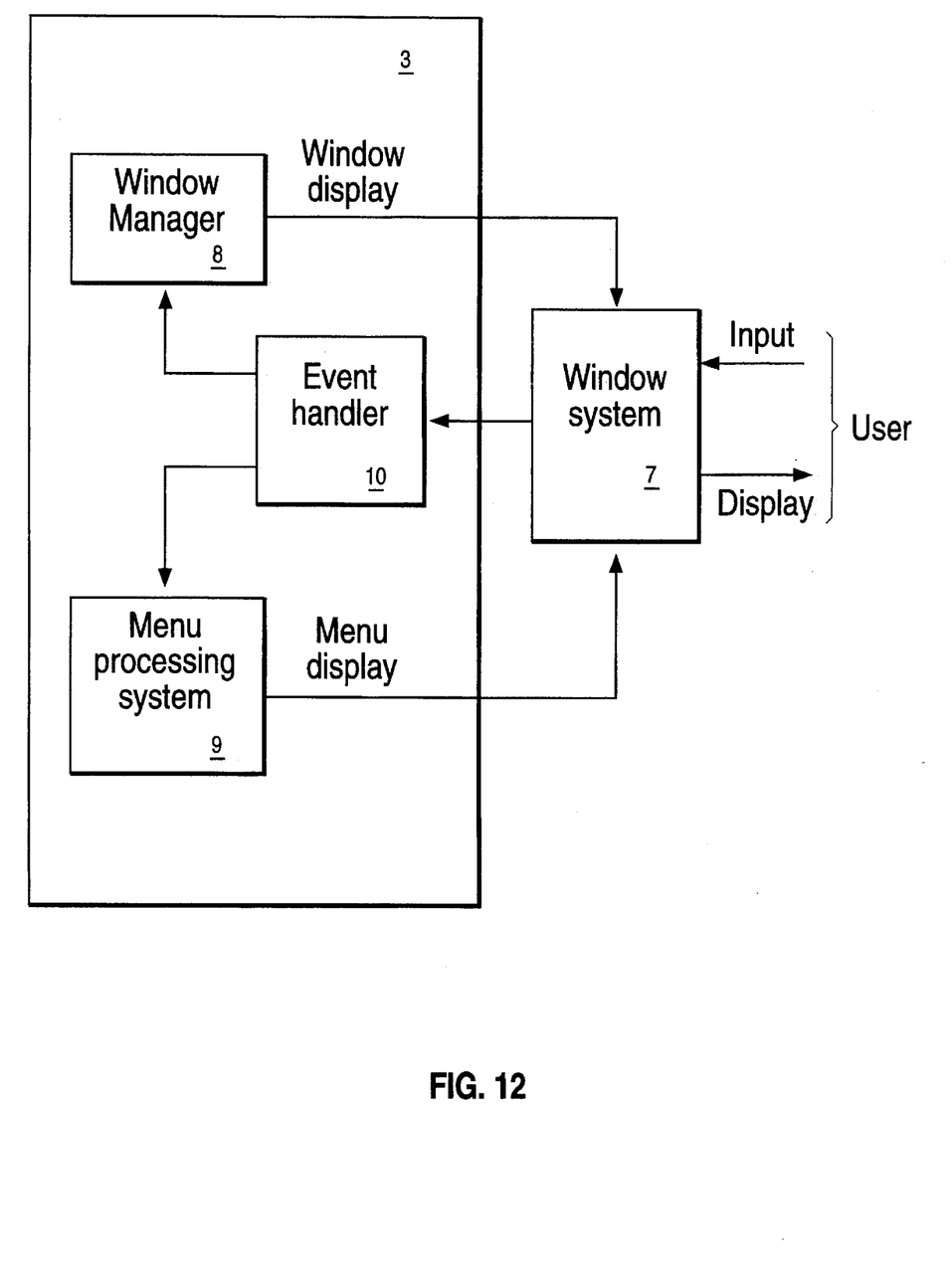
FIG. 12 is a diagram showing the main portions of the embodiment of the present invention.

FIG. 12 illustrates data reception and transfer between user interface management system 3 and window system 7 of FIG. 11. In FIG. 12, user interface management system 3 has event handler 10 as well as window manager 8 and menu processing system 9. Event handler 10 receives event information from window system 7 and passes it to window manager 8 and menu processing system 9. Window manager 8 modifies the position or size of the window according to the event information. Menu processing system 9 is adapted to execute the process routines shown in FIGS. 14 to 17 which are described later, according to the event information, and has menu bar information management section 11, pull-down information management section 12 and calibration information management section 13. These information management sections 11, 12 and 13 will be described later.

With such a configuration, a user performs an initial calibration and the application program logs the menu data. Thereafter, when the user gives an indication using pen 6b on transparent tablet 6a, window system 7 on operating system 2 generates event information in response to the user indication and sends it out to user interface management system 3. User interface management system 3 provides instructions for performing the display and selection of the menu to menu processing system 9 according to the event information, and menu processing system 9 again displays the menu on liquid crystal display device 5 via window system 7 for item selection from the subsequent event. When the menu selection is determined, the previously displayed menu is erased and the selected data is transferred to the application program.

Figure 13:
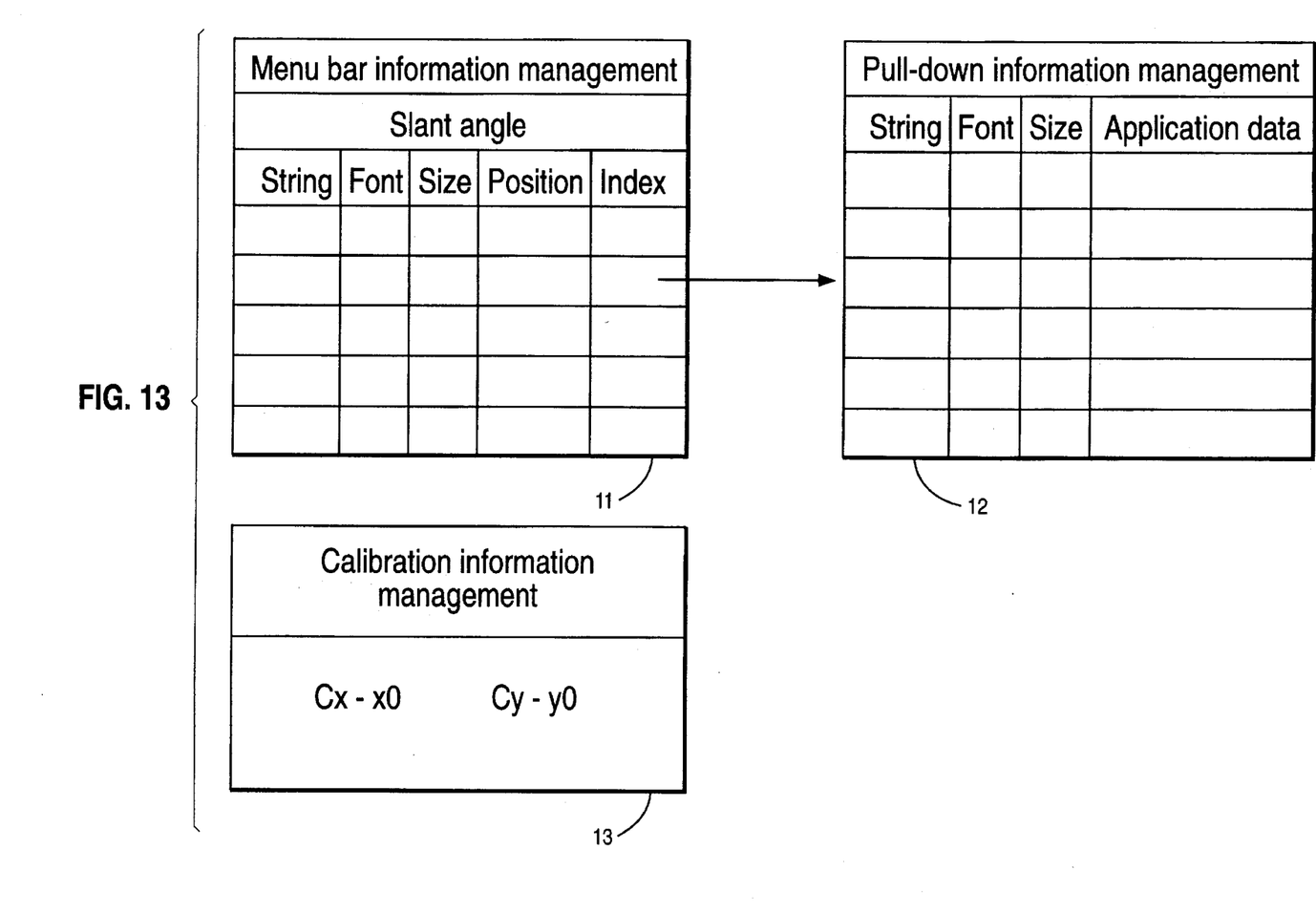
FIG. 13 is a diagram showing part of the main portions of the embodiment of the present invention in further detail.
Figure 14:
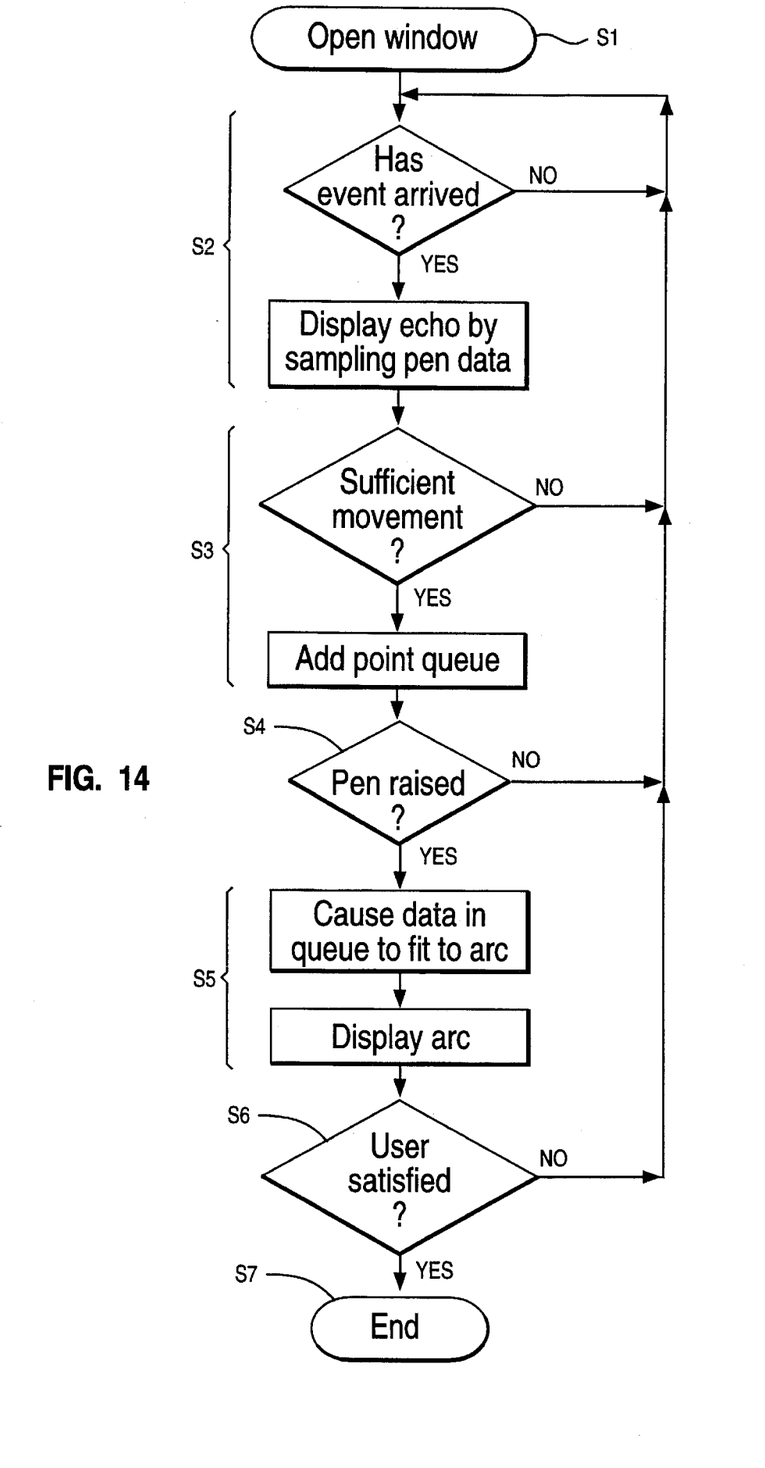
FIG. 14 is a flow chart for explaining the operation of the embodiment of the present invention.

FIG. 13 is given to further depict the configuration of menu processing system 9 of FIG. 12. In FIG. 13, menu processing system 9 has menu bar information management section 11, pull-down information management section 12 and calibration information management section 13. Menu bar information management section 11 includes the display information, e.g., display character string, color, font, display icon data, size, width, height, etc., of all the items constituting the menu bar, position information, i.e., coordinates of the position of the start point for displaying each item, inclination angle, and index pointing to pull-down information. Pull-down information management section 12 includes the display information, e.g. , display character string, color, font, size, width, height, etc., of all the items constituting the pull-down, and application data to be passed to the application program when actually selected. Calibration information management section 13 includes the information of the arc based on the swing of the user's wrist. The central coordinates of the relative arc as seen from the position at which the pen point is positioned.

The operation of this embodiment is now described.

To explain the utilization of the menu system, these stages are sequentially described. That is, they are (1) calibration process, (2) initialization by the application program, and (3) interactive menu. The switching of these three processes is usually performed by operating system 2 or another independent application software.

Calibration Process

The calibration process extracts the information on the elements of the swing of the user's wrist and processes it into a form which can be treated by the previously described calibration information management section 13. The calibration procedure is described below according to FIG. 14. The user first tells the system that he will perform a calibration or execute the calibration software. The system provides a window for calibration to the user and waits for input (step S1). When window system 7 informs that the user has dropped the point of pen 6b within the window. The transparent tablet 6a has sensed the coordinates and simultaneously confirmed that the pen point has been contacted with it. The sampling of data for calibration is initiated (step S2). If the user moves the pen point even slightly, window system 7 sends the data of the pen point to menu processing system 9. Although menu processing system 9 provides an echo display to the user, it does not recognize the inputting of a new point until the pen point of the user moves a fixed distance. Only if the movement is equal to or exceeds the fixed distance, it recognizes the pen point as a new point and stores the coordinates of the point in the system (step S3). The sampling is repeated until the pen point is disengaged from transparent tablet 6a (step S4). As a result, point string data of the movement of the pen point of the user is obtained.

Then, using both end points and the middle point of the obtained data string, the point string is fitted to an arc. The fitting method is as shown in FIG. 8. The arc data (Cx, Cy, Cr) obtained from this is discriminately displayed in superposition on the previously echoed back and displayed locus of the pen point of the user for instance, overwritten with a different color (step S5). If the user is unsatisfied with the fitting, these steps are repeated (step S6). By transferring the data (Cx–XO, Cy–YO) of the finally obtained arc data to calibration management section 13, the calibration process is terminated (step S7). However, (XO, YO) represents the coordinate value of the first point of the pen point data. Incidentally, since the difference between right-handedness and left-handedness appears in the sign of Cx (Cx>=0 for right-handedness, Cx<0 for left-handedness), no special branch processing is required.

Initialization by Application Program

This initialization is performed in a manner similar to the conventional menu system, for instance, AIX Windows or OS/2 Presentation Manager of IBM Japan, Ltd. First, the application program performs the setting of the display information (display character string, color, font, display icon data, etc.) of all the items constituting the menu bar of menu bar information management section 11, the display information (display character string, color, font, size (width, height), etc.) of all the items constituting the pull-down of pull-down information management section 12 and the application data provided to the application program when actually selected.

Then, the size (width, height) is obtained and set using the character string length and font information from the display information of each item of menu bar information management section 11. For instance, if AIX PS/2 of IBM Japan, Ltd. is used as operating system 2 and AIX windows of the said company are used as window system 7, the system can be allowed to perform the calculation using that information. Furthermore, from such information, the position information, the coordinates of the position of the start point for displaying each item, and the inclination angle are calculated by the procedure shown in FIG. 15.

Figure 15:
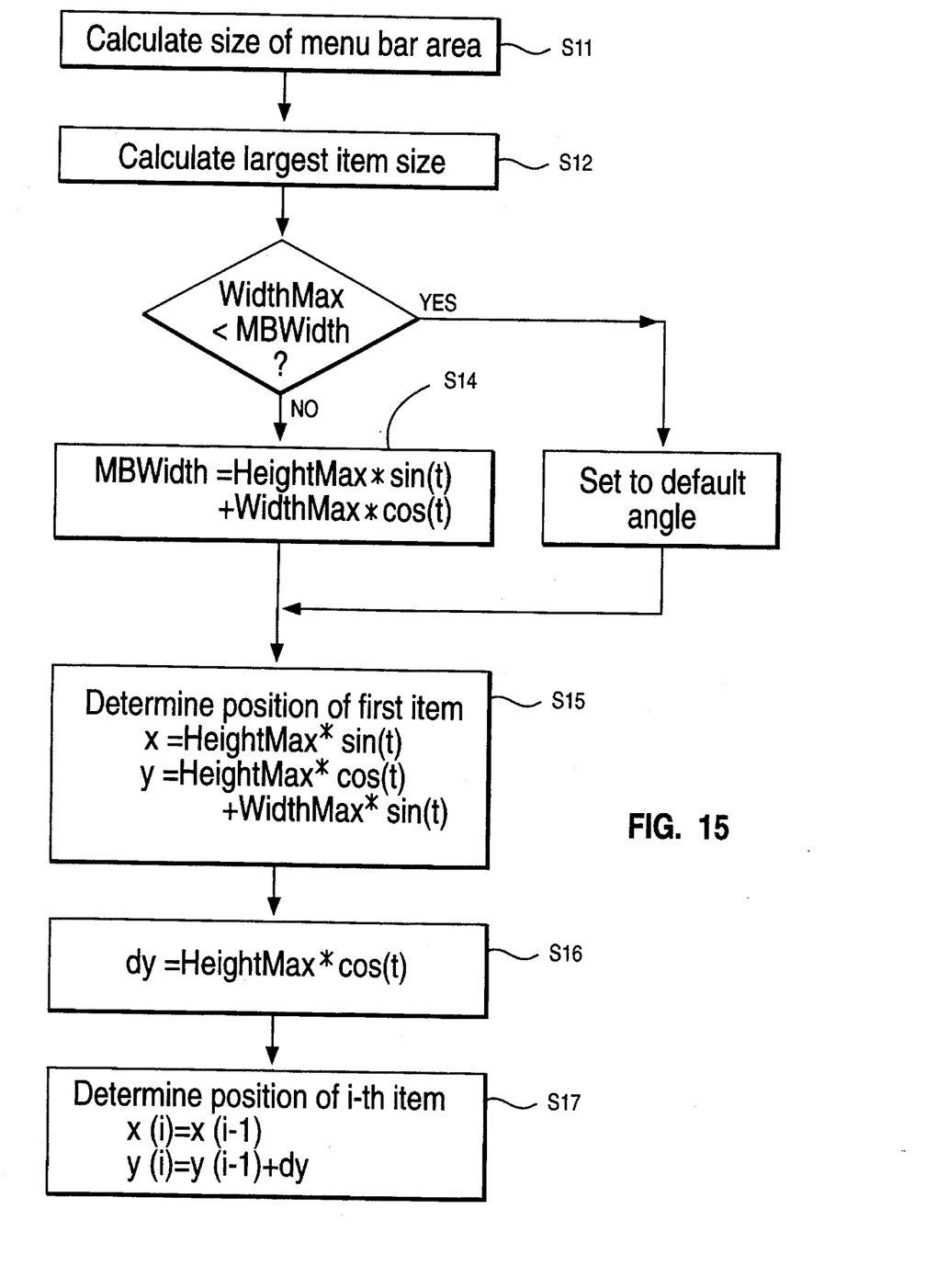
FIG. 15 is a flow chart for explaining the operation of the embodiment of the present invention.

First, the region available for the menu bar (MBWidth, MBHeight) is calculated from the window size required by the application, the size of the currently available screen, and the window size required by the user (step S11). Next, only for those items having display information in characters, the maximum value of their width (WidthMax) is calculated. The maximum value of the height (HeightMax) is similarly calculated (step S12). If this value (WidthMax) is smaller than the previously stated MBWidth, the default inclination angle is set; otherwise 0 is calculated from MBWidth=HeightMax*sin(0+WidthMax*cos(O(step S13), and this value is compared with the maximum inclination value previously possessed by the system and the smaller one is set as the inclination angle (step S14). Then, the positions of the items are sequentially determined using this value. First, the position (Y-coordinate) of the first item is calculated from the following equation. y=HeightMax*cos(0+WidthMax*sin(0 (step S15). Then, the subsequent items including the second item are determined by sequentially adding dy=HeightMax*cos(0 to the preceding Y-coordinate (steps S16, S17). As the X-coordinate, a fixed value x=HeightMax*sin(0 is set throughout all the items (steps S16, S17). Finally, the initialization by the application program is terminated by setting the index of pull-down information management section 12 pointed to from each menu bar item in the index within menu bar information management section 11.

Interactive Menu Processing

Figure 16:
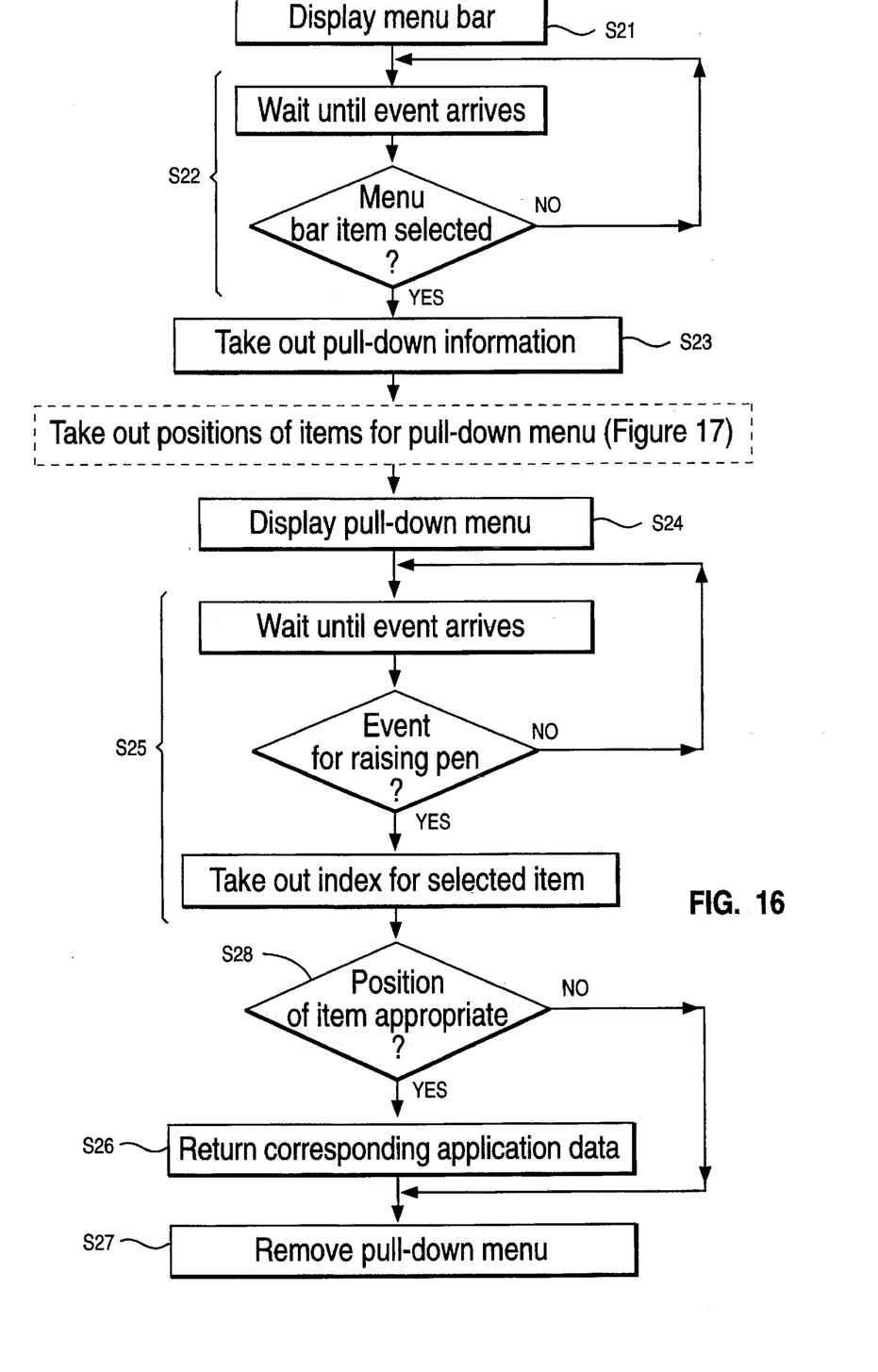
FIG. 16 is a flow chart for explaining the operation of the embodiment of the present invention.

The menu processing flow is shown in FIG. 16. Menu processing system 9 first uses the data of menu bar information management section 11 to display the menu bar in the window specified by the application (step S21). Since all information required to display each item has already been set at the time of the previous initialization, no special calculation is required at this point. For display of a character string, all that is needed is that the point at the lower left of a string box just surrounding the character string represent the coordinates of position information for each item and display is made with inclination of the angle specified by the inclination angle. Icons may be displayed without inclination. When an event is sent from window system 7 for indicating that the user has clicked the pen point in some item, from the coordinates of the pen point, which item has been pointed is retrieved and the flow moves to the pull-down processing (step S22).

The pull-down processing also begins at the pull-down menu display. First, using the index of pull-down information management section 12 corresponding to the selected item of the menu bar, pull-down management information is obtained (step S23). Then, using this information, the calibration information and the coordinate values of the selected pull-down item, the pull-down item is displayed (step S24). The method for determining the display positions of the pull-down items is described later in FIG. 17. Similarly to the above menu bar case, it is also determined from the event of the pen point coordinates which item has been selected (step S25), and the application data corresponding to the particular item is delivered to the application program (step S26). Finally, the menu processing is terminated by erasing the pull-down items from the screen (step S27). In addition, if a menu selection event occurs outside the pull-down items display area, it is deemed that the menu processing has been canceled, and the process flows to step 6 (step S28).

Figure 17:
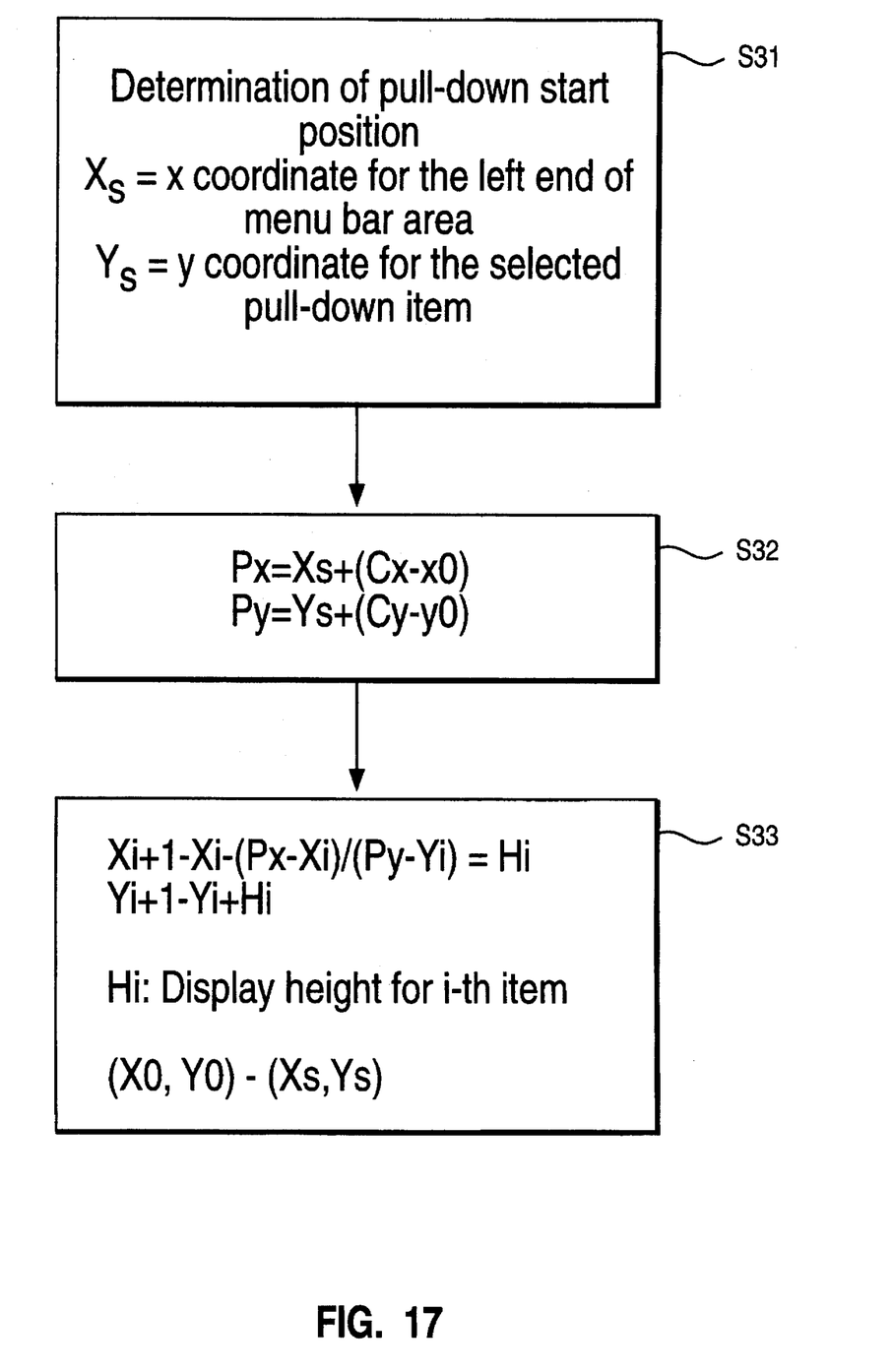
FIG. 17 is a flow chart for explaining the operation of the embodiment of the present invention.

The previously described method for determining each pull-down item displaying position is now described using FIG. 17. First, the coordinates of a point at the upper right of a string box surrounding the character string of the first item are determined in the following way (step S31).
Xs=X-coordinate value of the left end of menu bar region
Ys=Y-coordinate value of selected pull-down item
Then the following values are preliminarily calculated for the subsequent calculations (step S32).

$$Px=Xs+(Cx-XO) \; Py=Ys+(Cy-YO)$$

Where (Cx–XO) and (Cy–YO) are the previously described calibration data. For the second item or an item thereafter (i+1-th item), the coordinates are recurrently calculated using the preceding coordinate values (Xi, Yi) and (Px, Py) in the following manner (step S33).

$$Xi+1 = Xi - (Px-Xi)/(Py-Yi) * (\text{Height of display of i-th item})$$

$$Yi+1 = Yi + (\text{Height of display of i-th item})$$

By sequentially calculating this for all the remaining items, all the display positions can be determined.

The present invention is not intended to be restricted to the above embodiment, and various modifications are available. For instance, if the pen is provided with a button, to use the pen button for the trigger for selection, or for specifying selection or cancellation can also be adopted in the present invention as in the existing menu system. Moreover, a vertical menu bar may be displayed as needed, or the vertical menu bar and the conventional lateral menu bar may selectively be displayed. In addition, it is also allowed to display the vertical menu bar in the standard system using a bit map display and a mouse. Furthermore, the present invention can also apply not only to personal computers but also to interactive systems such as workstations and remote terminals.

As described above, in accordance with the present invention, a menu bar is displayed at the right or left end of the screen, and thus a tablet can be provided on the screen of the display device and the inconvenience that the menu bar is hidden by the hand can be avoided even when inputting is performed by directly contacting the tablet surface with a pen.

I claim:

1. A menu display system including processor and for user specification of pull down menu alignment comprising:

a display device;

pointing means for inputting points on the screen of the display device;

calibrating means for fitting the points input by the pointing means to an arc;

means for displaying a set of menu items on the display device in a vertical direction; and means, responsive to selecting one of the set of menu items, for displaying a pull down menu of the selected menu item aligned along the arc extending generally from the selected menu item.

2. The system as recited in claim 1 wherein the set of menu items are displayed along a vertical edge of the display screen.

3. The system as recited in claim 1 wherein the set of menu items are displayed along a vertical edge of a window.

4. The system as recited in claim 3 which further comprises means for selecting which edge of the display screen to display the set of menu items.

5. The system as recited in claim 1 wherein each of the menu items is displayed in a diagonal direction relative to the vertical direction in which the set of menu items is displayed.

6. The system as recited in claim 4 wherein the selecting means is responsive to a direction of curvature of the arc.

7. The system as recited in claim 1 wherein the pointing means is a pen input device which a user manipulates over the display screen and the arc is based on the swing of the user's wrist.

8. A menu display system for user specification of pull down menu alignment comprising:

means for displaying a set of menu items on a display screen in a vertical direction means for sensing a plurality of points input by a pointing device along a diagonal direction; and means, responsive to selecting one of the set of menu items, for displaying a pull down menu extending from the selected menu item aligned diagonally according to inputted points.

9. The system as recited in claim 8 wherein the set of menu claims are displayed along a vertical edge of the display screen.

10. The system as recited in claim 8 wherein the set of menu items are displayed along a vertical edge of a window.

11. The system as recited in claim 10 which further comprises means for selecting which edge of the display screen to display the set of menu items.

12. A method for displaying a menu and pull down menu aligned according to user specification, comprising the steps of:

inputting a set of points on a display screen;

fitting the inputted points to an arc;

displaying a set of menu items on a display screen in a vertical direction; and responsive to selecting one of the menu items, displaying a pull down menu aligned along the arc extending generally from the selected menu item.

13. The method as recited in claim 12 wherein the set of menu claims are displayed along a vertical edge of a window.

14. The method as recited in claim 13 which further comprises means for selecting which edge of the display screen to display the set of menu items.

15. The method as recited in claim 12 wherein each of the menu items is displayed in a diagonal direction relative to the vertical direction in which the set of menu items is displayed.

16. The method as recited in claim 14 wherein the selecting step is responsive to a direction of curvature of the arc.

17. The method as recited in claim 12 wherein the pointing means is a pen input device which a user manipulates over the display screen and the arc is based on the swing of the user's wrist.

18. A method for displaying a menu and pull down menu aligned according to a set specification, comprising the steps of:

displaying a set of menu items on a display screen in a vertical direction fitting a plurality of points input by a pointing device to an arc; and responsive selecting one of the menu items, displaying a pull down menu aligned along the arc projecting diagonally from the selected menu item.

19. The method as recited in claim 18 wherein in each of the menu items is displayed in a diagonal direction relative to the vertical direction in which the set of menu items is displayed.

20. The method is recited in claim 18 further comprising the step of selecting a side of the display device foro the set of menu items responsive to a direction angle of curvature of the arc.

21. The method as recited in claim 18 wherein a user manipulates a pen input device over the display screen and the arc is based on the swing of the user's wrist, 22. A storage device for displaying a menu and pull down menu aligned according to user specification on the display of a data processing system including a processor and a pointing device, the storage device comprising:

calibrating means for fitting points input by a pointing means to an arc;

means for displaying a set of menu items of a system display in a vertical direction; and means, responsive to selecting one of the menu items, for displaying a pull down menu aligned along the arc extending generally from the selected menu item;

the means activated when the storage device is connected to and accessed by the data processing system.

23. The device as recited in claim 22 wherein the set of menu items are displayed along a vertical edge of a window.

24. The device as recited in claim 23 which further comprises means for selecting which edge of the display screen to display the set of menu items.

25. The device as recited in claim 22 wherein in each of the menu items is displayed in a diagonal direction relative to the vertical direction in which the set of menu items is displayed.

26. The device is recited in claim 24 wherein the selecting means is responsive to a direction of curvature of the arc.

27. The device as recited in claim 23 wherein the pointing device is a pen input device which a user manipulates over the display screen and the arc is based on the swing of the user s wrist.

* * * * *